United States Patent
Vuarnoz et al.

(10) Patent No.: US 7,381,758 B2
(45) Date of Patent: Jun. 3, 2008

(54) INK COMPOSITION COMPRISING OPTICALLY VARIABLE PIGMENTS, USE OF THE COMPOSITION, OPTICALLY VARIABLE PIGMENT AND METHOD OF TREATING SAID PIGMENT

(75) Inventors: Aline Vuarnoz, Corserey (CH); Olivier Amrein, Lausanne (CH); Patrick Veya, Morges (CH)

(73) Assignee: SICPA Holding S.A., Prilly (CH)

( * ) Notice: Subject to any disclaimer, the term of this patent is extended or adjusted under 35 U.S.C. 154(b) by 375 days.

(21) Appl. No.: 10/486,918

(22) PCT Filed: Aug. 15, 2002

(86) PCT No.: PCT/EP02/09133

§ 371 (c)(1),
(2), (4) Date: Mar. 12, 2004

(87) PCT Pub. No.: WO03/020834

PCT Pub. Date: Mar. 13, 2003

(65) Prior Publication Data

US 2004/0249017 A1    Dec. 9, 2004

(30) Foreign Application Priority Data

Aug. 28, 2001 (EP) ................... 01120499

(51) Int. Cl.
C09K 11/00 (2006.01)
(52) U.S. Cl. ................. 523/160; 428/403; 523/161
(58) Field of Classification Search ............. 523/160, 523/161; 428/403
See application file for complete search history.

(56) References Cited

U.S. PATENT DOCUMENTS

| 5,104,922 A | | 4/1992 | Chang |
| 5,171,363 A | * | 12/1992 | Phillips et al. ........... 106/31.65 |
| 5,498,781 A | | 3/1996 | Hall et al. |
| 5,527,848 A | | 6/1996 | Carpenter et al. |
| 5,545,677 A | | 8/1996 | Hall et al. |
| 5,552,458 A | | 9/1996 | Hall et al. |
| 5,658,976 A | | 8/1997 | Carpenter et al. |
| 6,127,462 A | | 10/2000 | Chen et al. |
| 6,132,504 A | * | 10/2000 | Kuntz et al. ................. 106/404 |
| 6,428,846 B2 | * | 8/2002 | Kaupp et al. ................. 427/216 |
| 6,472,455 B1 | * | 10/2002 | Bleikolm et al. ............. 523/160 |
| 6,596,805 B1 | * | 7/2003 | Nigam et al. ................. 524/527 |
| 6,686,042 B1 | * | 2/2004 | LeGallee ...................... 428/403 |
| 6,972,305 B1 | * | 12/2005 | Griessmann et al. ......... 523/171 |
| 2005/0113484 A1 | * | 5/2005 | Kamen et al. ............... 523/160 |

FOREIGN PATENT DOCUMENTS

| EP | 133644 | 4/1990 |
| EP | 581235 | 2/1994 |
| EP | 0649865 | 4/1995 |
| EP | 678561 | 10/1995 |
| EP | 595131 | 9/1996 |
| EP | 688833 | 9/1999 |
| EP | 0984043 | 3/2000 |
| EP | 1090963 | 4/2001 |
| WO | WO 93/03103 | 2/1993 |
| WO | WO 00/22049 | 4/2000 |
| WO | WO 01/00738 A1 * | 1/2001 |

OTHER PUBLICATIONS

Müller/Schubert; Fluorosurfactants protect metal pigments (German with English Translation); Dec. 1999.
Du Pont; Zonyl UR fluorosurfactants (Introduction); Oct. 1997.
Du Pont; Zonyl UR fluorosurfactants (Product Description); Mar. 1998.
Albright & Wilson; Virco-Pet ®20 Corrosion Inhibitor MTH042883, 1995.
Batzilla/Tulke; Journal of Coatings Technology vol. 70, No. 881 (p. 77-83); Jun. 1998.
Müller/Balz; Farbe & Lack 98 (p. 758-761)(German with English translation); Oct. 1992.
Müller; Surface coatings International 2000 (1)(p. 33-35); 2000.
Müller/Schubert/Oughourlian; Pigment & Resin Technology vol. 30 No. 1 p. 6-12; 2001.
Müller/Schubert; Europ.coat Journal (p. 34, 35, 38); Nov. 1999.
Bleikholm; Publication No. XP-001034391; Jan. 28, 1998.
B. Müller; Publication No. XP-002189119 (p. 241-244); 2000.

* cited by examiner

*Primary Examiner*—Edward J. Cain
(74) *Attorney, Agent, or Firm*—Shoemaker and Mattare

(57) ABSTRACT

The invention relates to passivated optically variable pigment, a method of preparing said passivated optically variable pigment, an ink composition comprising said passivated optically variable pigment, the use of said ink composition, and a document carrying a marking made with said ink composition.

7 Claims, No Drawings

INK COMPOSITION COMPRISING OPTICALLY VARIABLE PIGMENTS, USE OF THE COMPOSITION, OPTICALLY VARIABLE PIGMENT AND METHOD OF TREATING SAID PIGMENT

The invention relates to passivated optically variable pigment, a method of preparing said passivated optically variable pigment, an ink composition comprising said passivated optically variable pigment, the use of said ink composition, and a document carrying a marking made with said ink composition.

Inks containing optically variable pigment as an overt security feature are widely used on bank notes and value documents, in order to protect them from counterfeiting by generally available color reproduction equipment such as color copiers, scanners and printers.

A common type of optically variable pigment is based on a layered optical interference structure. The interference structure typically has at least one metallic reflecting layer, at least one transparent dielectric layer and at least one semitransparent metal layer. Metals like aluminum, gold, copper or silver are used as the metallic reflecting layer, chemical compounds like magnesium fluoride, silicon dioxide or aluminum oxide are used as the transparent dielectric layer and metals like chromium or nickel are used as the semitransparent metal layer.

Incident white light is partially reflected at the pigment's semitransparent surface layer, and partially at the underlying metal layer. The difference in optical path between both parts of reflected light results in constructive or destructive interference, depending on the wavelength, i.e. enhances the reflectivity for certain wavelengths and reduces it for others. This spectral discrimination is perceived by the human eye as the appearance of color. For different angles of view, the difference in optical path changes, which makes the layered material exhibit angle-dependent color.

Optically variable pigments are usually manufactured by vacuum deposition of the different required layers onto a flexible web. After deposition of the desired number of layers, the stack of layers is removed from the web, either by dissolving the web in a suitable solvent, or by stripping the optically variable material from the web. The optically variable material is then broken down to flakes which have to be further processed to fit the proposed application, by e.g. grinding, milling, etc. The resulting product consists of flat flakes with broken edges and irregular shapes and different aspect ratios. The flakes have two planar, parallel surfaces showing said interference properties.

The term "aspect ratio" defines the ratio between the extension of the flake in the planar dimensions and the thickness of the interference layer stack. The former is generally of the order of 5 to 40 µm, whereas the latter is generally of the order of 1 µm.

A practical embodiment of the optically variable pigment flake is based on a symmetric $Cr/MgF_2/Al/MgF_2/Cr$ stack, wherein the thickness of the chromium absorber layers is 3.5 nm, that of the $MgF_2$ dielectric layers is between 200 and 600 nm, and that of the aluminum reflector layer is about 60 nm. The chromium surface layers constitute furthermore an efficient protection of the underlying $MgF_2$ and Al layers against chemical attack.

In the area of broken edges, however, the inner layers of the stack are accessible and not covered by any protective layer. For environmental reasons water-based ink formulations are now widely used and required. However at the pH value of water-based inks, corrosion of certain materials of the optically variable pigment can occur.

For example, ink formulations containing water-borne acrylic emulsions have generally a pH value in the range of 7.0 to 8.5. Under these conditions aluminum may be attacked, in particular in the presence of carboxylic groups and other chemical agents which form complexes with the $Al^{3+}$ ion. Simultaneously hydrogen gas is liberated, blowing up the flakes' interference structure, destroying the optically variable color effect. The magnesium fluoride of the dielectric layers can as well be dissolved by water, which also destroys the interference pigment, and thus the optically variable color effect.

U.S. Pat. Nos. 5,527,848 and 5,658,976 describe passivation of optically variable pigments by treating the pigment flakes with transition metal and rare earth metal salt solutions, which create a thin coating on the pigment surface. U.S. Pat. Nos. 5,545,677, 5,552,458 and 5,498,781 and EP 0688833 describe the passivation of optically variable pigments by modifying the pigments in a chemical reaction with a silane functional group. These modified pigments are used for preparing a pigmented coating formulation.

It is an object of the present invention to protect optically variable pigment of the mentioned type, in order to reduce or inhibit the oxidation of its metal layers and the dissolution of its dielectric layers. The chemical nature of the different materials of the multi-layered $Cr/MgF_2/Al/MgF_2/Cr$ construction of said optically variable pigment requires noteworthy a specific selection of the passivating agent.

It is a further object of the present invention to use such protected pigments in ink compositions. A particular object of the present invention is a water-based screen printing ink formulation containing an passivating system for said optically variable pigments.

These and other objects are achieved by the invention in accordance with the independent claims.

An ink composition in accordance with the invention comprises an organic binder system, water, and a pigment selected from the group of interference pigments comprising a layered stack of different materials wherein at least one of the layers is a reflective layer having at least one chemically exposed surface and at least one of the layers is a dielectric layer having at least one chemically exposed surface, and said materials comprise one or more metal and/or inorganic metal compounds, said metal and/or inorganic metal compound being corrosion susceptible and wherein at least the chemically exposed surface of said reflective and said dielectric layer at the edge of said stack of layers is substantially covered by a passivating agent, which is selected from the group of anionic tensides.

The term "tenside" describes chemical compounds which combine two different types of chemical functionalities, i.e a hydrophobic part, called the "tail" of the tenside, and which is soluble in solvents with low polarity (such as hydrocarbons), and a polar or hydrophilic part, called the "head" of the tenside, which is soluble in solvents with high polarity (such as water). The "head" of the tenside can be charged (anionic or cationic) or it can be without charge. A tenside may also have more than one head, and/or more than one tail.

The tensides are thus able to solubilize polar entities in a non-polar medium by assembling on the surface of the polar entity, with the polar head of the tenside pointing to the entity and the non-polar tail of the tenside pointing to the non-polar medium. In a similar way, tensides can also solubilize non-polar entities (such as grease) in a polar medium (such as water).

A tenside may consist of a phosphoric acid group as the "head" and an organic chain (e.g a hydrocarbon or a fluorinated hydrocarbon) as the "tail" or the "tails". Said tail groups can be attached to the phosphoric acid by esterification, yielding phosphates. Phosphoric acid can provide up to three hydroxyl groups for esterification. Furthermore, partly esterified phosphoric acid acts as a buffer via the amount of protonated and deprotonated hydroxyl groups. This allows to use them as pH-control-agents.

The hydroxyl groups and the oxygen atom of phosphates are furthermore able to act as complex-forming agents toward electrophilic metal ions. "Complex-forming" means hereby an electrostatic interaction between a nucleophilic ligand (hydroxyl groups and/or oxygen atom of the phosphoric acid) and an electrophilic cation, such as $H^+$, $Mg^{2+}$, $Al^{3+}$, etc., resulting in a chemical bonding (attachment) of the ligand to the cation. Attachment of a ligand to a cation can result either in a molecular complex, where a cation is completely surrounded by ligands, or in a surface complex, where a cation is part of a solid surface (oxide, fluoride, etc.), having its free, exposed side occupied by one or more ligands.

Preferred passivating agents for optically variable pigments of the types mentioned before are found in the group of organic esters and fluorinated organic esters of phosphoric acid. These phosphoric acid esters (phosphates), which are known and commercially available as surfactants, were surprisingly found to exhibit excellent attachment properties to the different materials of optically variable pigments of the $Cr/MgF_2/Al/MgF_2/Cr$ type.

In a preferred embodiment of the invention, the ink composition comprises optically variable pigments wherein the reflecting layers are selected from the group of metals comprising Al, Fe, Ni, Cr, Zn. These metals exhibit suitable properties for the preparation of the optically variable pigments and further excellent properties as reflecting layers. The mentioned phosphate tenside molecules are noteworthy able to firmly attach to these metal ions via the phosphate "head", and thus to protect (passivate) the optically variable pigment flake against further attack by the reactive chemicals from the surroundings (ink formulation) by their hydrocarbon or fluorohydrocarbon "tails".

The passivation of the optically variable pigment can be done in two ways. In a first way, the ink composition comprises the passivating agent, and the untreated optically variable pigment is directly added to this ink composition. However it is also possible, in a second way, to pre-treat the optically variable pigment with the passivating agent, prior to incorporating the pigment into the ink composition.

In both cases, according to the invention, it was found that adding a surplus of passivating agent to the ink composition is beneficial, in order to protect any fresh surface which, for example, may appear during a mixing operation.

Preferably, according to the invention, the ink composition comprises optically variable pigments having dielectric layers selected from the group of inorganic metal compounds consisting of $MgF_2$, $Fe_2O_3$, $Cr_2O_3$, $MgO$, $SiO_2$. The metal cations of these compounds were found to attach firmly to the phosphate head groups of the tenside.

The invention allows therefore the use in corrosive medium such as water-based ink compositions, of highly reflective but corrosion susceptible pigments.

Particularly stable passivation can be achieved if the ink composition comprises a passivating agent selected from the group of organic esters and fluorinated organic esters of phosphoric acid which have the following generic structural formula:

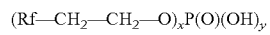

wherein:
$Rf=F-(CF_2-CF_2)_z$
x=1 or 2
y=2 or 1
x+y=3
Z=1 to 7

Subscript x indicates the number of tails of the tenside molecule; subscript y indicates the number of hydroxyl groups available for complex formation with metal ions. The sum of the subscripts x and y is always three. The selection of x and y also defines the properties of the head group of the tenside. The subscript z indicated the number of $(CF_2CF_2)$ entities which are connected to the $CH_2CH_2O$ unit linking the tail to the head group of the tenside. The choice of z further selects specific properties of the tenside regarding solubility in different solvents. Tenside molecules of the described structural formula, having a z ranging from one to seven, were found to have suitable properties for the proposed use as a passivating agent for optically variable pigments in ink formulations.

In an preferred embodiment of the invention, an ink composition contains the passivating agent in an amount of 0.5 to 15% w referred to the weight of the optically variable pigment. More preferred is an amount of 1.5 to 6.5% w and an even more preferred amount is 2.5 to 5.0% w of the weight of optically variable pigment. These amounts of passivating agent were found to be sufficient to cover the pigments at least with a double layer of tenside molecules, and are therefore able to shield the metal or dielectric layers of the pigment efficiently against the corrosive environment of the ink formulation. Similar amounts as described were also found to be sufficient in the direct treatment of the optically variable pigment, in order to cover its active surface and to obtain neat, passivated optically variable pigment for different kinds of applications.

Another aspect of the invention is an ink composition comprising passivated optically variable pigment and having a pH value between 7.0 to 9.0. Preferred is a pH value of the ink composition between 7.3 and 8.5 and more preferred a pH between 7.5 to 8.0. The selected pH value allows the use of lower amounts of passivating agent while maintaining the corrosion stability of the optically variable pigments and still maintaining excellent properties of the ink composition prior to printing.

A further embodiment of the invention is an ink composition wherein the passivating agent is dissolved in an organic solvent. The use of dissolved passivating agent provides a better availability of the tenside molecules to cover the surface of the optically variable pigments and therefore an improved covering of the surface.

In a preferred embodiment of the invention the organic solvent for dissolving the passivating agent in the ink composition is selected from the group of glycol ethers or the group of glycols. These compounds provide for an excellent solubility of said tensides.

A further aspect of the invention is an ink composition comprising passivated optically variable pigment and a binder system which comprises an acrylic or urethane acrylic copolymer emulsion, a crosslinker, optionally a catalyst and optionally further additives. The acrylic or urethane acrylic copolymer emulsions are selected in such a way that the emulsion is alkali soluble. This selection allows to manufacture a stable ink composition without the risk of precipitation of the copolymer emulsion from the composition.

Furthermore, an acrylic or an urethane acrylic copolymer emulsion is selected which has a $T_g$ value in the temperature range of −10° to 50° C. The "glass transition" value $T_g$ defines the temperature range within the emulsion will change from an almost solid or highly viscous state (glass-like) to a low viscous state (fluid-like). The inventors have found that the $T_g$ value has an important influence on the processability of the ink composition during printing.

The "crosslinker" is a component which is able to build up a three-dimensional polymer network by reacting either with further components of the ink composition, or with other crosslinker molecules. "Curing" in the context of this specification means the drying or solidifying or polymerizing reacting of the printed ink after printing in such a manner that the ink can i) no longer be removed from the substrate and ii) does no longer tack to other substrates placed upon the printed ink. Additionally the curing effects a passivation of the printed ink against various kinds of treatments (water, solvents, acids, bases, etc.) within specified limits.

The term "grafting" means the stable bonding of the crosslinker molecule to the polymer molecules of the acrylic or urethane acrylic copolymer emulsions. The modified (grafted) molecules will have almost the same physical properties as before the grafting reaction.

The "catalyst" is a chemical compound which lowers the activation threshold for a specified type of reaction and therefore promotes the said reaction. The catalyst will remain in the same chemical composition after the reaction as prior to it. Due to this fact a catalyst is required only in small amounts.

"Additives" comprises those compounds and materials which are used for adjusting physical and chemical parameters of the ink composition, such as the pH value, the viscosity, the consistency, the foaming properties, the lubricating properties etc.

In a preferred embodiment, the ink composition comprises a acrylic or urethane acrylic copolymer emulsion of the binder system which is selected from the group of polymers having self-crosslinking properties. These properties open the possibility to build an interconnected network which encloses the pigment particles in such a way that they get enhanced resistance against chemical and physical treatments.

In a further preferred embodiment, the ink composition comprises a crosslinker of the binder system which is selected from the group of substituted alkoxy silanes $(R_1)_y$ $(R_{20})_z Si$ (wherein $R_1$, $R_2$ are different substituents, y+z=4), preferably from the group of monosubstituted trialkoxy silanes (y=1, z=3). The substituents $R_1$, $R_2$ of the crosslinker comprise two different chemical functionalities wherein the first functionality $R_1$ is selected in such way that it reacts prior to printing and wherein the second functionality $R_2$ is selected to effect curing of the printed ink.

The first functionality provides the possibility for grafting the acrylic or urethane acrylic copolymer emulsion with a crosslinking molecule which is able to react in a second step, upon a further initialization (second functionality). This can be done by a short raise of temperature which initiates the release of protons by the decomposition of compounds introduced for the neutralization of the emulsion, and which starts in consequence the curing of the printed ink film. "Chemical functionalities" means that a chemical compound contains a group of atoms which undergo a preferred specific type of reaction, e.g —OH or —SH groups are able to react with acids to form esters with the help of a catalyst. The various chemical functionalities are well known to a person skilled in the art. Using a selected choice of conditions (e.g. temperature, solvent etc.) the skilled in the art is able to control the reaction of chemical compounds which contain more than one chemical functionality in such a way that only one of the chemical functionalities reacts.

In an even more preferred embodiment of the ink composition, the crosslinker of the binder system is selected from the group of monosubstituted triethoxysilanes, preferably from the group of epoxy-cycloaliphatic triethoxysilanes and from the group of glycidyl-triethoxysilanes. An ethoxy group as substituent $R_2$ provides a reactive group which can be hydrolysed under controlled conditions and which is susceptible to react with other components of the ink formulation or with the substrate The epoxy entity as substituent $R_1$ is able to react with functional groups of the acrylic or urethane acrylic copolymer emulsion, creating a pre-formed network prior to the printing process.

An additional aspect of the invention concerns an ink composition which comprises an amount of crosslinker in a range between 0.25 and 3.0% w referred to the total weight of the composition. A preferred ink composition comprises an amount of crosslinker between 0.5 and 2% w and an even more preferred ink composition comprises an amount of crosslinker between 1 and 2% w. The described amounts were found to impart sufficient resistance to the printed and cured ink.

Preferably the ink composition contains optically variable pigment in amounts ranging between 10 to 25% w of the total weight of the composition. An ink composition with an amount of optically variable pigment of 12 to 20% w is preferred and an amount of 15 to 18% w is even more preferred. The disclosed amounts of optically variable pigment yield an ink composition which exhibits an excellent color coverage and offers the possibility of easy visual and/or machine detection of the optical properties of the printed and cured ink.

According to the invention optically variable thin-film interference pigments are used which are characterized in that the surface of said pigment is covered with a passivating agent. Said passivating agent is selected from the group of anionic tensides, and in a preferred embodiment, selected from the group of organic esters and fluorinated organic esters of phosphoric acid (phosphates). As already mentioned above, the tenside primarily acts as a mediator between hydrophilic and hydrophobic components, and can thus, for example, solubilize grease in water or vice versa. In addition of being surfactants, the phosphate head group of the tenside is a good complex-former and therefore susceptible for attaching itself to metal ions and to metal-ion-containing surfaces.

A further aspect of the invention concerns a method of passivating optically variable pigments, said method including the following steps:
  a) provide a passivating agent or a solution of that said passivating agent and dissolve it in an organic solvent;
  b) add water to the resulting solution of step a) and mix thoroughly;
  c) adjust the pH of the mixture to a value between 7.3 and 8.5; preferably between 7.5 and 8.0;
  d) disperse optically variable pigment to the mixture obtained in step (c).

The dissolution of the passivating agent in an organic solvent followed by the addition of water and pH-adjustment provides a solution-dispersed tenside. The adjustment of the pH-value prior to the addition of the optically variable pigment avoids or reduces the risk of a possible reaction of the acidic form of the tenside with the optically variable pigment. This method allows to reduce to a minimum the amount of necessary tenside in order to passivate the surfaces of the optically variable pigment.

In a preferred embodiment of the invention, the method of passivating optically variable pigments comprises the use of said passivating agent in amounts ranging between 0.5 to 15% w referred to the total weight of the optically variable pigment. More preferred amounts are between 1.5 to 6.5% w and even more preferred amounts are between 2.5 to 5.0% w. As already mentioned above, these amounts allow for an excellent coverage of the surface of the pigment flakes.

Another aspect of the invention concerns a method of passivating optically variable pigments, whereby the organic solvent is selected from the group of glycol ethers or from the group of glycols. These types of solvents were found to allow for suitable solvation of the tenside.

Still another aspect of the invention concerns a method of passivating optically variable pigments whereby the pH value of the solution containing the passivating agent is preferably adjusted to pH 7.3 to 8.5 and more preferably adjusted to pH 7.5 to 8.0. These values were found to result in minimal amounts of corrosive species, i.e. phosphoric acid and hydroxide ion, populating the passivating solution, and allow therefore to use a minimal amount of passivating agent with respect to the optically variable pigment and still to achieve an efficient passivation.

An additional aspect of the invention concerns the use of said ink composition comprising said passivated optically variable pigments for water-based screen, flexo or gravure printing. Traditional those printing techniques are noteworthy tied to large amounts of organic solvents which are added to the ink in order to obtain the required low viscosity for application, and which must be evaporated after printing. Water-based inks rely on polymer emulsions in water, and avoid therefore potential health-hazards to the printing workers, whilst being at the same time environment-friendly. Water-based ink formulations are almost incompatible with optically variable pigments, in that they have a very short shelf life due to pigment degradation. The present invention allows to formulate water-based inks containing optically variable pigments whilst having comparable shelf life to solvent based inks containing the same pigments.

A further aspect of the invention concerns a marking on a document which is obtained by screen, flexo or gravure printing the ink composition of the invention. Markings containing the passivated optically variable pigment exhibit excellent resistance against chemical and physical agents, compared to similar markings containing the same, but non-passivated optically variable pigment. The markings containing passivated optically variable pigment exhibit as well improved optical features (such as indicated by the measured values of chroma and color shift) compared to markings containing optically variable pigments which are not passivated. The long-term color stability of the printings containing passivated optically variable pigment is improved as well.

An additional aspect of the invention concerns a document carrying a marking obtained by printing an ink according the invention.

The invention will now be explained further by non-limiting examples regarding to the passivation of optically variable pigments and to ink compositions which are given for purposes of illustration.

List of abbreviations:

| | |
|---|---|
| Imicure EMI-24 (Air Products) | 2-Ethyl-4-methylimidazole |
| AMP-95 (Angus Chemie GmbH) | 2-Amino-2-methyl-1-propanol 95% solution |
| DMA Fluka | (N,N'-dimethylethanolamine) |
| Neocryl XK-11 | NeoResins / Avecia |
| Neocryl XK-14 | NeoResins / Avecia |
| Neocryl BT-9 | NeoResins / Avecia |
| Neocryl BT-20 | NeoResins / Avecia |
| Armorez CR2900 | Westvaco |
| CoatOSil ® 1770 | Witco Co. beta-(3,4-Epoxycyclohexyl) ethyltriethoxysilane |
| CoatOSil ® Y-11988 | Witco Co 40% emulsion of CoatOSil ® 1770 in water |
| CX-100 | NeoResins/Avecia polyaziridine compound |
| Zonyl ® UR | Dupont Fluorosurfactant |

Passivation of Optically Variable Pigments

The optically variable pigments (OVP) used in the described examples comprise 3 different materials, noteworthy a thin film of aluminum (Al), a dielectric layer of magnesium fluoride ($MgF_2$) and a very thin layer of chromium (Cr). Aluminium is known to be attacked by water under alcaline conditions, according to the chemical equation:

$$2Al + 6H_2O + 2OH^- \rightarrow 2[Al(OH)_4]^- + 3H_2.$$

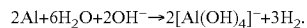

Magnesium fluoride, $MgF_2$, in turn, is slightly soluble in water. Qualitative and quantitative analyses of the water-soluble residues (Mg, Al, Cr) of the optically variable pigments were obtained using atomic absorption spectrometry, an analytical method well known to the skilled in the art. Concentrations of soluble Mg, Al and Cr were thus measured from supernatant solutions obtained after dispersing optically variable pigment in water at pH=8.5. The evolution of said concentrations was subsequently followed over a time period of 2 months.

EXAMPLE I

Direct Passivation in Water 1.4 g of the acidic form of passivating agent Zonyl®UR are dissolved in 10 mL of butylglycol. The solution is diluted up to 100 mL with deionised water. The pH is adjusted with DMA (N,N'-dimethylethanolamine). 5 g of OVP are dispersed in 95 g of the above described solution (Sample 1) at T=25° C. The OVP dispersion is filtered after 1 day, 1, 2, 3 weeks and 2 months. Filtrates are diluted up to 200 mL, analysed by AAS. As a reference the same procedure is performed on non-passivated OVP (Reference 1).

Results of the AAS analysis of passivated and non-passivated OVP in solution of pH 8.5 at varying reaction times.

| t/days | 1 | 7 | 14 | 21 | 60 |
|---|---|---|---|---|---|
| | | passivated OVP (Sample 1) | | | |
| Mg* | 3.0 | 3.5 | 4.0 | 4.0 | 6.0 |
| Al* | 0.84 | 0.28 | 0.62 | 0.60 | 2.11 |
| Cr* | 1.22 | 1.49 | 1.43 | 1.38 | 1.51 |

-continued

| t/days | 1 | 7 | 14 | 21 | 60 |
|---|---|---|---|---|---|
| non-passivated OVP (Reference 1) | | | | | |
| Mg* | 24.0 | 27.0 | 25.0 | 27.0 | 31.5 |
| Al* | 1.67 | 0.91 | 0.98 | 0.60 | 1.03 |
| Cr* | 0.02 | 0.01 | 0.03 | 0.05 | 0.00 |

*Atom concentrations in ppm

The passivating agent reduces the Mg and Al concentration at a pH value of 8.5 compared to the non-passivated samples, except for the Al concentration at 60 days reaction time. The Cr concentration is higher than the OVP which has not been passivated. The passivating agent seems to complexate and stabilize the Cr ions in the solution.

The molecules of the passivating agent arrange themselves in multi-layers and thus create an hydrophobic barrier which avoid molecules of water to reach the OVP surface and hydrate $MgF_2$. It is believed that water molecules when hydrating $MgF_2$ would cause swelling of the dielectric layer and impair or destroy the optically shift. These multi-layers further avoid Al oxidation caused by attack of hydroxide ions.

EXAMPLE II 0.5 g of Zonyl®UR is dissolved in 6 g dipropyleneglycol methylether and completed to 100 g with deionised water. AMP-95 is added to adjust the pH to 8.5 at T=25° C. 15 g of green-to-blue OVP are dispersed with 85 g of that solution (Sample 2). A reference is prepared without passivating additive at pH=8.5 (Reference 2). After 24 hours, the dispersion is filtered, washed thoroughly with deionised water, but not dried, and the OVP sample is re-dispersed in solutions of the same pH: 1. with Zonyl®UR (sample 3) and 2. without Zonyl® UR (sample 4). Concentrations of Mg, Al and Cr are measured using AAS after 24 hours and 2 weeks according to the same procedure.

Results of the AAS analysis of samples 2 (S2), 3 (S3), 4 (S4) and reference 2 (R2) at varying reaction times.

|  | Mg*/pH = 8.5 | | | | Al*/pH = 10 | | | | Cr*/pH = 8.5 | | | |
|---|---|---|---|---|---|---|---|---|---|---|---|---|
|  | S2 | S3 | S4 | R2 | S2 | S3 | S4 | R2 | S2 | S3 | S4 | R2 |
| 1 d | 3.0 | 10.5 | 11.0 | 10.0 | 4.72 | 4.19 | 9.58 | 8.82 | 1.22 | 0.02 | 0.01 | 0.02 |
| 14 d | 4.0 | 19.25 | 19.0 | 15.0 | 4.22 | 2.09 | 1.56 | 1.0 | 1.43 | 0.04 | 0.02 | 0.03 |

*Atom concentrations in ppm

The described method uses a ratio of Zonyl®UR to OVP green/blue which is six times lower than compared to sample 1 therefore the concentration values are different.

The fine dispersion of metallic Cr in the form of nanoscopic flakes or clusters acts in the presence of passivating agent as a very effective wetting and dispersing aid. These nano-particles of Cr come from the "dust" caused by the crunching operation during OVP manufacturing. The passivating agent detach the "dust" from the OVP surface and disperse it in water in a very effective way. The nanoparticles are too small to be filtered off. Cr is no longer present in solution when OVP is filtered, washed and placed again in the same conditions. Nevertheless the Cr concentration is very low [Cr]<1.5 ppm.

EXAMPLE III

Indirect Passivation in a Non-Aqueous Solution 0.5 g of Zonyl®UR are dissolved in 6.0 g of dipropyleneglycol methylether and 0.14 g of AMP-95 are added to neutralise the additive of passivation. This solution is added to the OVP (15 g). Mixing is done manually in order to achieve a good wetting and the mixture is left for 24 hours. 7.22 g of this mixture which contains 5 g of pure OVP is added to a water solution (total: 100 g) at pH=8.5 and T=25° C. The dispersion is filtered off after 24 hours and 2 weeks, solutions are completed to 200 mL and analysed by AAS (Sample 5).

Results of the AAS analysis of samples 1 (S1) and 5 (S5) and reference 1 (R1) at varying reaction times.

|  | Mg*/pH = 8.5 | | | Al*/pH = 10.0 | | | Cr*/pH = 8.5 | | |
|---|---|---|---|---|---|---|---|---|---|
|  | S1 | R1 | S5 | S1 | R1 | S5 | S1 | R1 | S5 |
| 1 d | 3.0 | 30.2 | 14.5 | 4.72 | 0.88 | 1.07 | 1.22 | 0.0 | 0.03 |
| 14 d | 4.0 | 19.75 | 18.25 | 4.22 | 0.42 | 1.22 | 1.43 | 0.0 | 0.03 |

*Atom concentrations in ppm

With an equal concentration of OVP, at pH=8.5, the initial concentration of Mg (14.5 ppm) is largely higher after 24 hours compared to sample 1 (3 ppm), but significantly lower to a reference without passivation (30.2 ppm). Concentrations of Mg tend to reach the same value after 2 weeks (19.75 ppm).

EXAMPLE IV

Influence of Different Concentrations of Zonyl®U 0, 0.1, 0.25, 0.5, 1 and 2 g of Zonyl®UR are added to 6 g of dipropyleneglycol methylether, the pH value is adjusted to 8.5 with AMP-95. Water is further added to complete the solution to 85 g. 15 g of OVP green/blue (sample 6) or 15 g of Chromaflair® magenta/gold (sample 7) are dispersed in this solution. Passivated OVP or passivated Chromaflair® is filtered off after 24 hours and 2 months respectively, the solutions are completed to 200 mL and analysed by AAS. The Chromaflair® pigments have been thermally treated to stand hydrolysis in difficult weather conditions (developed for the car industry).

Resulting Mg concentration for different amounts of Zonyl®UR at pH 8.5 and at T=25° C.:

|  | 0% | 0.1% | 0.25% | 0.5% | 1% | 2% |
|---|---|---|---|---|---|---|
| | | | Sample 6 | | | |
| 1 day | 24.0 | 6.0 | 3.5 | 2.0 | 2.5 | 4.0 |
| 60 days | 31.5 | 12.32 | 10.33 | 5.82 | 3.28 | 3.78 |
| | | | Sample 7 | | | |
| 1 day | 9.5 | 3.1 | 1.1 | 1.6 | 2.2 | 4.1 |
| 60 days | 34.88 | 23.88 | 9.71 | 6.5 | 2.13 | 3.78 |

The concentration of Mg is dependent to the Zonyl®UR concentration as it can be seen from the table. The optimum concentration is comprised between 0.25 and 1%, ideally at 0.5%. The OVP/Zonyl®UR ratio should be kept between 1.5 and 6.5.

For OVP with 0.5% of Zonyl®UR, the concentration of Mg is divided by 12 within 24 hours. After 2 months the concentration of Mg increases but it is still five times lower with 0.5% of Zonyl®UR and eight times with 1% than without Zonyl®UR.

For Chromaflair®, with 0.5% of Zonyl®UR the concentration of Mg is divided by 6 within 24 hours. After 2 months the concentration of Mg increases but it is still 5 times lower with 0.5% of Zonyl UR and 16 times with 1% than without Zonyl®UR.

The concentration of Mg is two times lower with a Chromaflair® pigment compared to an OVP pigment.

EXAMPLE V

One component water-based ink compositions with passivated optically variable pigments for rotary screen press application.

Water-based screen inks with color-shifting or optically variable pigment are applied on security banknote paper using an automatic hand-coater (hand-coater bar no 3, wet film thickness of 24 μm). The applied ink is dried for 30 seconds at 80° C. and the adhesion is checked with a finger nail. Chemical and physical resistances are normally measured with solvents, acid and alkali bleeding at RT or elevated temperature, wet crumpling (=WC) and dry crumpling (=DC), wet rub (=WR) and dry rub (=DR), laundry tests (specifications as established by INTERPOL at the 5$^{th}$ International Conference on Currency and Counterfeiting in 1969, or to the Bureau of Engraving and Printing's test methods as stated in BEP-88-214 (TN) section M5). Resistances to laundry, wet rub and alkali bleeding are normally the most difficult to achieve. The wet and dry crumpling tests were performed on a IGT instrument. A print by approx. 5×5 cm is rolled and introduced in a tube. The roll of paper is crunched in the tube using a piece of metal which has the same diameter. The piece of paper is flattened and rolled again in an other direction (by 90°). After 4×, the print is turned on the other side. The operation is repeated 4× (wet) or 8× (dry). The wet test is done in the same conditions using a print which has been damped in water for 10 minutes.

Rub tests were pursued with a Prüfbau instrument. Conditions: dry rub tests, 100× with a 610 g weight and wet rub tests after having damped samples for 10 minutes in water.

The first laundry test, called laundry solution with stirring, is performed using a 1 L reactor, comprising a mechanical stirrer, a heating mantle, containing 500 mL of water, 2.5 g of industrial laundry powder (Persil, Henkel or equivalent) and 5 g $Na_2CO_3$. Three printed samples (squares with 5×5 cm on edge) are placed in the reactor, stirred and heated for 30 minutes. Samples are washed off using distilled water and dried for 2 hours at 40° C. The result is estimated on a average of three samples. The slow mechanical stirring and high temperature of this test is the illustration of a specific chemical test. The second laundry test, called washing machine test, is performed using a standard washing machine (Lavamat W 1020, AEG) with 2 kilogramms of cotton fabrics and 100 mL of laundry powder (Persil, Henkel). Printed samples (squares with 5×5 cm on edge) are placed in individual cotton pockets. The laundry test is pursued at 95° C. for 40 minutes. The result is estimated on a average of three samples. The good mixing in individual pockets and the high temperature is the illustration of a specific physical test.

The ink alteration is visually estimated according to the following scale:

| Note | Visual ink alteration |
|---|---|
| 6 | No alteration |
| 5 | 0-20% |
| 4 | 20-33% |
| 3 | 33-50% |
| 2 | 50-66% |
| 1 | 66-80% |
| 0 | 80-100% |

Sample 8 and 10 consist of passivated optically variable pigments. Sample 9 and 11 contain the same optically variable pigments but in a non passivated state. The ink samples are prepared following the procedure:

Sample 8:

1. Pigment Passivation In Situ in Water:

| | |
|---|---|
| Propylenglycolmethylether | 6.0 |
| Zonyl UR | 0.5 |
| Water | 22.0 |
| OVP green/blue | 15.0 |
| AMP-95 | 0.25 |

To a solution of Zonyl®UR in propylenglycolmethylether at 50° C. water is added. Further, OVP is added at room temperature when mixing and pH is maintained between 7.5-8.0 with AMP-95. The OVP pigment is dispersed slowly (500 RPM) using a lab mixer for 30 minutes.

Preparation of the Ink:

| | |
|---|---|
| Neocryl XK-11 | 48.0 |
| Jonwax 22 | 3.0 |
| Byk 024 (BYK-Chemie) | 1.9 |
| Byk 025 (BYK-Chemie) | 0.1 |
| Aerosil 200 (BYK-Chemie) | 1.0 |
| CoatOSil 1770 Witco Co. | 1.0 |
| Silwet L-7608 Witco Co. | 0.1 |

All components are introduced directly into the OVP dispersion and stirred for 5 minutes at 1000-1500 RPM. pH is measured and adjusted to 7.5-8.0 if necessary with AMP-95. CoatOSil®1770 and Silwet L-7608 are added as a blend to the ink under good mixing at 1500 RPM for 15 minutes.

2. Viscosity Adjustment:

| | |
|---|---|
| Water | 1.7 |
| Rheolat 278 | 0.55 |

The thickener (Rheolat 278) is added carefully in order to obtain a viscosity between 250±50 mPa·s. If necessary, AMP-95 is added to maintain the pH between 7.5-8.0.

The same ink is made without the passivation agent Zonyl®UR (Sample 9). An ink using a Chromaflair™ pigment (magenta to gold) with and without Zonyl®UR is also prepared the same way (Examples 10 and 11).

Results of ink composition with passivated and non-passivated optically variable pigments.

|  | Sample 8 | | Sample 9 | | Sample 10 | | Sample 11 | |
| --- | --- | --- | --- | --- | --- | --- | --- | --- |
| months | LWM* | LSS* | LWM* | LSS* | LWM* | LSS* | LWM* | LSS* |
| 0 | 5.5 | 5.75 | 4.5 | 5.25 | 5.35 | 5.25 | 4.3 | 5.25 |
| 1 | 2.3 | 5.7 | 3.7 | 5.5 | 5.2 | 5.6 | 4.3 | 5.3 |
| 2 | 1 | 5.5 | 2.3 | 5.7 | 4.75 | 5 | 4.1 | 5.5 |

*LWM: laundry with washing machine; LSS: laundry solution + stirring

EXAMPLE VI

Stability of an ink composition for rotary screen press application with regard to polymerization.

The viscosity of samples 8 to 11 are checked after definite times. A further series of samples are prepared according to example V except that prior to step three of preparation (viscosity adjustment) the ink composition is aged overnight (samples 12 to 15).

|  | 0 d | 7 d | 14 d | 30 d | 60 d | 90 d |
| --- | --- | --- | --- | --- | --- | --- |
|  | | | 25° C. | | | |
| S8 | 220 | 735 | 735 | 835 | 870 | 980 |
| S9 | 250 | 915 | 850 | 870 | 930 | 955 |
| S10 | 260 | 490 | 460 | 480 | 510 | 615 |
| S11 | 250 | 760 | 725 | 785 | 850 | 840 |
|  | | | 40° C. | | | |
| S8 | 220 | 880 | 900 | 1090 | 1575 | 2540 |
| S9 | 250 | 4150 | 4525 | gel. | gel. | gel. |
| S10 | 260 | 600 | 545 | 7354 | 695 | 850 |
| S11 | 250 | 840 | 820 | 1660 | gel. | gel. |

-continued

|  | 0 d | 1 d | 2 d | 58 d | 84 d | 198 d |
| --- | --- | --- | --- | --- | --- | --- |
|  | | | 25° C. | | | |
| S12 | 290 | 365 | 370 | 435 | 450 | 755 |
| S13 | 265 | 290 | 300 | 355 | 360 | 530 |
| S14 | 265 | 310 | 320 | 320 | 415 | 700 |
| S15 | 290 | 305 | 340 | 440 | 430 | 690 | gel. = the ink gelified and no viscosity measurement is possible.

Color Shift Stability

The inks of samples 12 to 15 are kept at 25° C. and applied on banknote paper using an automatic hand-coater (bar No 3, speed 3). The first color is measured at 0° (specular angle) with illumination at 22.5° and the second color is measured at 67.5° with illumination at 45° using a goniospectrometer especially developed for optically variable inks coloristic measurements (Goniospektrometer Codec WI-10 5&5 by Phyma GmbH. Austria). Five measurements on three different prints are averaged. Coloristic values (L*, a*, b*, C*, h* and ΔE*) are recorded for each ink example and checked upon aging. The hue h* of OVI™ water-based screen inks (the coloristic difference between the ink printed after n days and the ink printed after manufacturing) are more stable upon aging using a passivating agent than without.

Results of hue h* measurements.

|  | 0 d | 1 d | 2 d | 6 d | 13 d | 22 d | 28 d | 56 d | 84 d |
| --- | --- | --- | --- | --- | --- | --- | --- | --- | --- |
|  | | | | First angle (0°) | | | | | |
| S12 | 117.23 | 117.19 | 116.99 | 116.82 | 115.98 | 116.30 | 116.07 | 115.89 | 116.55 |
| S13 | 116.83 | 116.13 | 116.07 | 114.79 | 114.81 | 114.98 | 114.74 | 114.40 | 114.80 |
| S14 | 313.97 | 313.71 | 313.33 | 313.20 | 312.55 | 313.43 | 131.06 | 312.51 | 313.45 |
| S15 | 131.19 | 131.03 | 312.24 | 312.31 | 311.21 | 312.25 | 312.36 | 311.06 | 311.86 |
|  | | | | Second angle (67.5°) | | | | | |
| S12 | 277.01 | 276.92 | 276.07 | 276.34 | 275.37 | 275.54 | 275.48 | 274.90 | 275.29 |
| 513 | 276.20 | 275.71 | 275.37 | 274.19 | 273.86 | 273.87 | 273.79 | 273.16 | 273.15 |
| S14 | 121.96 | 121.97 | 121.18 | 121.03 | 120.27 | 120.81 | 120.43 | 120.01 | 121.12 |
| 515 | 120.36 | 120.29 | 119.48 | 119.32 | 117.88 | 118.53 | 118.56 | 116.97 | 118.03 |

EXAMPLE VII

Preparation of one-component water-based inks with passivated OVP for flat screen press application.

Sample 16

1. Pigment Passivation In Situ in Water:

| | |
|---|---|
| Proglyde DMM | 6.0 |
| Zonyl UR | 0.5 |
| Water | 18.5 |
| OVP green/blue | 15.0 |
| AMP-95 | 0.25 |

Zonyl®UR is dissolved in Proglyde DMM (propylengly-coldimethylether) at 50° C. and water is added. OVP is added at room temperature when mixing and pH is maintained between 7.5-8.0 with AMP-95. The OVP pigment is dispersed slowly (500 RPM) using a lab mixer for 30 minutes.

2. Preparation of the Ink:

| | |
|---|---|
| Tego foamex 800 | 1.0 |
| Jonwax 22 | 3.0 |
| Neocryl BT-20 | 50.0 |
| AMP-95 | 1.0 |

Antifoaming additive and wax are added and mix for 5 minutes at 1000 RPM. Then, alkali soluble acrylic emulsion Neocryl BT-20 is simultaneously introduced directly into the OVP dispersion with AMP-95 and stirred for 5 minutes at 1000-1500 RPM in order to reach a pH comprised between 7.5-8.0.

3. Cross-Linker Addition:

| | |
|---|---|
| CoatOSil ®1770 | 2.0 |
| Silwet L-7608 | 0.2 |

CoatOSil®1770 and Silwet L-7608 are added as a blend to the ink under good mixing at 1500 RPM for 30 minutes. The ink is left overnight before viscosity correction.

4. Viscosity Adjustment:

| | |
|---|---|
| Aerosil 200 | 1.0 |
| Water | 0.25 |
| Acrysol RM-8 | 1.3 |
| Total | 100.00 |

The thickener (Acrysol RM-8) is added carefully in order to obtain a viscosity 800±50 mPa·s. If necessary, AMP-95 is added to maintain the pH between 7.5-8.0.

The same ink is made without the passivation agent Zonyl® UR (Sample 17). Two identical ink formulations are prepared with the magenta-green OVP pigment (Sample 18 with Zonyl®UR and sample 19 without Zonyl®UR).

The prepared inks (Samples 16-19) are kept at 25° C. and applied on banknote paper using an automatic hand-coater (bar No 3, speed 3). The first color is measured at 0° (specular angle) with illumination at 22.5° and the second color is measured at 67.5° with illumination at 45°. Five measurements on three different prints are averaged. Coloristic values (L*, a*, b*, C*, h* and ΔE*) are recorded for each ink example and checked upon aging. For example, the ΔE* of OVI™ water-based screen inks (the coloristic difference between the ink printed after n days and the ink printed after manufacturing) are more stable upon aging using a passivating agent at both view angles Results of ΔE* measurements.

| | 1 d | 2 d | 5 d | 7 d | 14 d | 21 d | 28 d | 57 d | 84 d |
|---|---|---|---|---|---|---|---|---|---|
| | First angle (0°) | | | | | | | | |
| S16 | 1.82 | 1.94 | 0.96 | 1.72 | 1.20 | 1.54 | 1.09 | 2.27 | 1.67 |
| S17 | 0.98 | 2.01 | 2.55 | 2.67 | 3.29 | 3.1 | 2.69 | 3.08 | 2.63 |
| S18 | 0.53 | 0.19 | 1.29 | 1.48 | 1.23 | 1.99 | 2.03 | 1.99 | 1.36 |
| S19 | 0.74 | 0.60 | 1.78 | 4.24 | 5.35 | 5.45 | 5.61 | 5.99 | 6.79 |
| | Second angle (67.5°) | | | | | | | | |
| S16 | 0.89 | 0.66 | 2.13 | 2.22 | 2.01 | 3.33 | 1.74 | 2.13 | 2.14 |
| S17 | 1.25 | 1.29 | 3.81 | 4.53 | 6.12 | 5.35 | 5.98 | 6.11 | 5.93 |
| S18 | 0.78 | 0.40 | 2.46 | 1.73 | 3.71 | 2.59 | 3.93 | 3.58 | 3.68 |
| S19 | 1.22 | 0.85 | 2.08 | 3.07 | 3.64 | 4.55 | 4.78 | 5.70 | 5.92 |

The invention claimed is:

1. A method of treating an optically variable pigment having a stack of planar layers, said stack of planar layers comprising at least one reflective layer and at least one dielectric layer, and at least one layer of a semitransparent metal layer made of Cr, said reflective layer and said dielectric layer having at least one chemically exposed edge surface and being corrosion susceptible said method comprising steps of
   (a) dissolving a passivating agent selected from the group consisting of organic esters and fluorinated organic esters of phosphoric acid having the structural formula $(Rf-CH2-CH_2-O)_xP(O)(OH)_y$ wherein:

Rf=F—(CF$_2$—CF$_2$)$_z$
   x=1 or 2
   y=2 or 1
   x+y=3
   Z=1 to 7, in an organic solvent;
   (b) mixing water into the solution provided in step a);
   (c) adjusting the pH of the composition obtained in step b) to a value between 7.0 to 9.0; and
   (d) dispersing said optically variable pigment into the composition obtained in step c) while keeping the pH value at 7.0 to 9.0.

2. A method according to claim 1 wherein the amount of the said passivating agent comprises 0.5 to 15.0% of the total weight of the optically variable pigment.

3. A method according to claim 1 wherein the amount of the said passivating agent comprises 1.5 to 6.5% of the total weight of the optically variable pigment.

4. A method according to claim 1 wherein the amount of the said passivating agent comprises 2.5 to 5.0% of the total weight of the optically variable pigment.

5. A method according to claim 1 wherein the organic solvent is selected from the group consisting of glycol ethers and glycols.

6. A method according to claim 1 wherein the pH value is adjusted to 7.3 to 8.5.

7. A method according to claim 1 wherein the pH value is adjusted to 7.5 to 8.0.

* * * * *